US011174433B2

(12) United States Patent
Losic et al.

(10) Patent No.: US 11,174,433 B2
(45) Date of Patent: Nov. 16, 2021

(54) GRAPHENE-BASED COMPOSITE FLAME RETARDANTS

(71) Applicant: The University of Adelaide, Adelaide (AU)

(72) Inventors: Dusan Losic, Seaford Rise (AU); Md Julker Nine, Kilburn (AU); Diana N H Tran, Burton (AU)

(73) Assignee: The University of Adelaide, Adelaide (AU)

(*) Notice: Subject to any disclaimer, the term of this patent is extended or adjusted under 35 U.S.C. 154(b) by 35 days.

(21) Appl. No.: 16/332,695

(22) PCT Filed: Sep. 12, 2017

(86) PCT No.: PCT/AU2017/050989
§ 371 (c)(1),
(2) Date: Mar. 12, 2019

(87) PCT Pub. No.: WO2018/045435
PCT Pub. Date: Mar. 15, 2018

(65) Prior Publication Data
US 2019/0249084 A1 Aug. 15, 2019

(30) Foreign Application Priority Data
Sep. 12, 2016 (AU) ............... 2016903663

(51) Int. Cl.
*C09K 21/02* (2006.01)
*C08K 3/38* (2006.01)
*C01B 32/192* (2017.01)
*C08K 3/04* (2006.01)
*C01B 32/19* (2017.01)
*C09K 21/06* (2006.01)
*C08K 3/22* (2006.01)
*C08J 7/05* (2020.01)
*C08J 7/06* (2006.01)
*C09D 5/18* (2006.01)

(52) U.S. Cl.
CPC ............ *C09K 21/02* (2013.01); *C01B 32/19* (2017.08); *C01B 32/192* (2017.08); *C08J 7/05* (2020.01); *C08J 7/06* (2013.01); *C08K 3/042* (2017.05); *C08K 3/22* (2013.01); *C08K 3/38* (2013.01); *C09D 5/18* (2013.01); *C09K 21/06* (2013.01); *C01P 2006/90* (2013.01); *C08J 2397/02* (2013.01); *C08K 2003/387* (2013.01)

(58) Field of Classification Search
CPC ........ C09K 21/02; C09K 21/06; C01B 32/19; C01B 32/192; C08K 3/22; C08K 3/042; C08K 3/38; C08K 2003/387; C08J 7/06; C08J 2397/02; C09D 5/18; C01P 2006/90
See application file for complete search history.

(56) References Cited

U.S. PATENT DOCUMENTS

| 2,886,425 A | 5/1959 | Seibert | |
|---|---|---|---|
| 2007/0100009 A1* | 5/2007 | Creazzo | ............... C08J 9/144 521/98 |
| 2011/0144244 A1* | 6/2011 | Lee | ................... C08L 23/06 524/84 |
| 2011/0180301 A1* | 7/2011 | Basfar | ................ H01B 7/295 174/110 SR |
| 2017/0029632 A1* | 2/2017 | Couturier | ............. C09D 5/18 |

OTHER PUBLICATIONS

Han Z. el al.. Enhanced fire retardancy of polyethylene/alumina trihydrate composites by graphene nanoplatelets, Materials Letters, 2014, vol. 128, pp. 275-278, Abstract, Experimental, Figures 2-3.
Sang B et al., Graphene-based flame retardants: a review, Journal of Materials Science, Jun. 20, 2016, vol. 51, pp. 8271-8295, pp. 8276-8279 (Conventional flame retardants-graphene blending flame retardant) and pp. 3285-8289 (Inorganic-nanomaterials graphene-based composite flame retardants).
Nine Md. J. et al., Graphene: The Multipurpose Material for Protective Coatings, Journal of Materials Chemistry A, 2013, vol. 3, p. 12580-12602.
Nine Md. J et al., Graphene-Borate as an Efficient Fire Retardant for Cellulosic Materials with Multiple and Synergetic Modes of Action, ACS Applied Materials & Interfaces, Feb. 28, 2017, vol. 9, p. 10160-10168.
Nine Md. J et al., Interlayer growth of borates for highly adhesive graphene coatings with enhanced abrasion resistance, fire-retardant and antibacterial ability, Carbon, Feb. 23, 2017, vol. 117, pp. 252-262.
International Search Report (PCT/AU2017/050989); dated Oct. 11, 2017.
International Preliminary Report on Patentability and Written Opinion (PCT/AU2017/050989); dated Mar. 12, 2019.

* cited by examiner

*Primary Examiner* — Robert S Jones, Jr.
(74) *Attorney, Agent, or Firm* — Howard & Howard Attorneys PLLC (57) ABSTRACT

The present invention relates to a method of improving fire retardant properties of a substrate, the method comprising providing the substrate with a graphene-based composite, wherein the graphene-based composite comprises graphene-based material intercalated with inorganic metal hydrate.

21 Claims, 4 Drawing Sheets

GRAPHENE-BASED COMPOSITE FLAME RETARDANTS

CROSS-REFERENCE TO RELATED APPLICATIONS

The present application is the National Stage of International Patent Application No. PCT/AU2017/050989, filed Sep. 12, 2017, which claims priority to and all the benefits of Australian Patent Application No. 2016903663, filed on Sep. 12, 2016, both disclosures of which are expressly incorporated herein by reference in their entirety.

FIELD OF THE INVENTION

The present invention relates in general to fire retardants. In particular, the invention relates to a method of improving fire retardant properties of a substrate, use of a composition to improve fire retardant properties of a substrate, and a substrate with improved fire retardant properties.

BACKGROUND OF THE INVENTION

Many solid products used in modern day life are flammable. Typical examples of such products include those manufactured from cellulosic material (e.g. wood, paper, natural fibres, etc) and polymeric material (e.g. polyethylene, polypropylene, polyamide, polyester, polyvinyl alcohol, polystyrene, etc). While such products provide important functionality, their inherent flammability can in circumstances present extreme danger to both humans and property alike.

In addition to loss or damage of the product, combustion of the product can release toxic and flammable volatiles and dangerous levels of heat, all of which present considerable occupational health and safety concerns.

The unintended combustion of products is therefore extremely undesirable.

To that end, considerable research has gone into developing techniques for reducing the flammability of flammable products.

For example, numerous fire retardants have been developed based on halogen, nitrogen and phosphorous compounds. Such fire retardants are typically coated on, absorbed in and/or compounded with a substrate material in order to reduce its flammability or delay its combustion.

Common fire retardant based on halogenated compounds include poly-brominated biphenyls, polychlorinated biphenyls, tris(2,3-dibromopropyl) phosphate, etc.

However, while effective as fire retardants, many commonly used compounds, for example, halogenated organic fire retardants, have been found to be extremely toxic and their use now presents considerable environmental concern.

Accordingly, there remains an opportunity to develop alternative approaches to improving fire retardant properties of flammable substrates that are not only effective but present less environmental concern.

SUMMARY OF THE INVENTION

The present invention therefore provides a method of improving fire retardant properties of a substrate, the method comprising providing the substrate with a graphene-based composite, wherein the graphene-based composite comprises graphene-based material intercalated with inorganic metal hydrate.

The invention further provides use of a graphene-based composite to improve fire retardant properties of a substrate, wherein the graphene-based composite comprises graphene-based material intercalated with inorganic metal hydrate.

The present invention further provides a substrate with improved fire retardant properties, the substrate comprising a graphene-based composite, wherein the graphene-based composite comprises graphene-based material intercalated with inorganic metal hydrate.

The graphene-based composite used in accordance with the invention has been found to impart excellent fire retardant properties to a substrate, the likes of which are surprisingly superior to using the constituent components of the composite alone.

The graphene-based composite has not only been found to impart flame-extinguishing behaviour to the substrate, but also it can advantageously reduce the release of toxic and flammable volatiles from the substrate upon it being exposed to fire.

Without wishing to be limited by theory, it is believed the inorganic metal hydrate functions as a heat sink as it undergoes endothermic dehydration releasing water into the surrounding environment. That in turn is believed to promote a unique intumescent effect. The graphene-based material is believed to function synergistically to promote fire resistance by providing at least four combined functions, including (i) preventing access of oxygen to the flammable substrate, (ii) providing self-extinguishing properties, (iii) preventing escape of toxic and flammable volatiles from the substrate, and (iv) exhibiting char formation and an intumescent effect. The graphene-based material is believed to also act as a carbon donor to create a physical barrier between the unburnt substrate and a flame to thereby protect the substrate. Still further, some inorganic metal hydrates can promote a high degree of binding between layers of the graphene-based material and also between the substrate and the composite graphene-based composite, thereby providing for a robust fire retardant system. This is particularly useful where the composite is provided in the form of a coating on a substrate.

Providing a substrate with the graphene-based composite in accordance with the invention can advantageously impart fire retardant properties to the substrate in an environmentally responsible manner as both the graphene-based material and the inorganic metal hydrate are relatively inert and environmentally benign substances.

The graphene-based composite may comprise graphene-based material selected from graphene, graphene oxide, reduced graphene oxide, partially reduced graphene oxide and combinations thereof.

There is no particular limitation on the type of the inorganic metal hydrate that may be used provided it can be intercalated with the graphene-based material. Examples of inorganic metal hydrates include hydrated: metal oxides, metal hydroxides, metal oxide hydroxides and metal borates.

Further aspects and embodiments of the invention are described in more detail below.

BRIEF DESCRIPTION OF THE DRAWINGS

The invention will herein be described with reference to the following non-limiting drawings in which.

Some figures have been filed in colour and are available on request.

DETAILED DESCRIPTION OF THE INVENTION

According to the invention there is provided a method of improving fire retardant properties of a substrate, use of a graphene-based composite to improve fire retardant properties of a substrate, and a substrate with improved fire retardant properties comprising the composite.

Reference to "improving", "improved" or "to improve" fire retardant properties in the context of the present invention is intended to mean an improvement of fire retardant properties of a substrate relative to that substrate having not being provided with the graphene-based composite in accordance with the invention.

Relevant fire retardant properties are those well known in the art and include ignitability and burn rate of a substrate, release of toxic/flammable volatiles from a substrate upon the substrate being exposed to an ignition source such as fire or extreme heat, self-extinguishing and intumescent properties, char formation/yield and oxygen barrier properties.

For example, a substrate provided with the graphene-based composite in accordance with the invention has been found to exhibit one or more of reduced ignitability, a lower burn rate, a pronounced intumescent effect, and reduced release of toxic/flammable volatiles upon being exposed to an ignition source, relative to the same substrate that has not been provided with the graphene-based composite according to the invention.

Fire retardant properties of a substrate can be determined using techniques know in the art. Such techniques include TGA, STA, UL-94, calorimeter, limiting oxygen index (LOI) measurements.

The substrate that exhibits the improved fire retardant properties according to the present invention will of course be a substrate that in its own right is flammable. In other words, the present invention relates to improving fire retardant properties of a flammable substrate.

Examples of substrates that may be used in accordance with the invention include those comprising cellulosic material, polymeric material and combinations thereof.

Examples of cellulosic material include, but are not limited to, wood, paper, saw dust, natural fibres and combinations thereof.

Examples of polymeric material include, but are not limited to, thermoset and thermoplastic polymers.

Specific examples of polymeric materials include, but are not limited to, polyolefins, polyamides, polyesters, polyvinyl alcohol, polystyrenes, polyurethanes, polycarbonates, epoxy resins, polyacrylates and combinations thereof.

There is no particular limitation on the physical form in which the substrate can take. For example, the substrate can be in the shape of a sheet, film, plank, fibre, powder, particles or any formed product.

In one embodiment, the substrate comprises cellulosic material, polymeric material or a combination thereof.

The graphene-based composite comprises graphene-based material intercalated with inorganic metal hydrate.

In the context of the present invention the expression "graphene-based" composite is intended to mean the composite has a composition comprising graphene, graphene oxide, partially reduced graphene oxide, reduced graphene oxide or a combination of two or more thereof. The expression "graphene-based" material may therefore be used herein as a convenient reference to graphene (material or sheets), graphene oxide (material or sheets), partially reduced graphene oxide (material or sheets), reduced graphene oxide (material or sheets) or a combination of two or more thereof.

Graphene is an allotrope of carbon having a one atom thick planar sheet structure of typically $sp^2$-bonded carbon atoms that are densely packed in a honeycomb 2D crystal lattice. The covalently bonded carbon atoms typically form repeating units that comprise 6-membered rings, but can also form 5-membered rings and/or 7-membered rings. A layer of such covalently bonded carbon atoms is commonly referred to as a graphene "sheet". Graphene may be synthetically prepared or derived by exfoliation of graphite.

Graphene oxide is an oxygenated form of graphene that is often prepared by exfoliation of graphite oxide. Graphene oxide is considered to have a graphene-based structure that is substituted with oxygenated groups such as hydroxyl and epoxide. Graphene oxide may be prepared using a number of techniques such as the so-called Brodie, Staudenmaier or Hummers methods.

Graphene oxide may be reduced so as to form a reduced form of graphene oxide. Reduced graphene oxide is both chemically and physically different to graphene oxide due to the loss of its oxygenated groups. The degree to which graphene oxide is reduced can be varied, with that variation being reflected in the amount of oxygenated groups remaining. Where graphene oxide is not fully reduced it is often referred to in the art as partially reduced graphene oxide. Reduced and partially reduced graphene oxide are less hydrophilic than graphene oxide. Reduced graphene oxide is sometimes referred to in the art simply as graphene as an indication that substantially all oxygenated groups have been removed. Techniques for reducing or partially reducing graphene oxide are well known in the art. For example, graphene oxide can be reduced or partially reduced by chemical or thermal reduction.

Graphene oxide, partially reduced graphene oxide and reduced graphene oxide have a covalently bonded carbon atom sheet structure similar to graphene.

The graphene-based material is intercalated with inorganic metal hydrate. The composite per se therefore comprises a plurality of graphene-based material sheets having intercalated there between inorganic metal hydrate.

Figure 1:
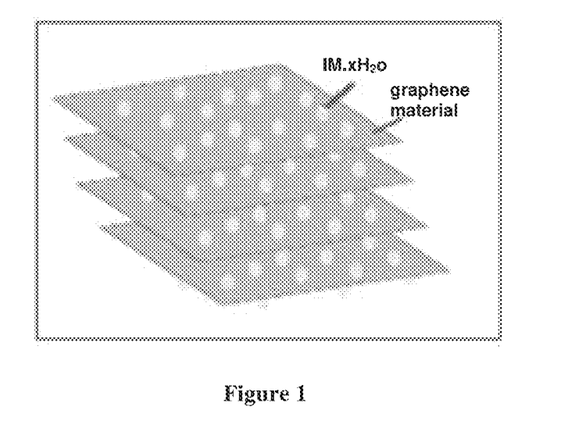
FIG. 1 shows a schematic illustration of the graphene-based composite used in accordance with the invention.

A schematic illustration of the graphene-based composite is presented in FIG. 1 which highlights the layered sheet structure of the graphene-based material and the inorganic metal hydrate ($IM.xH_2O$) intercalated within the layered sheet structure.

By the graphene-based material being "intercalated" with inorganic metal hydrate is therefore meant the inorganic metal hydrate resides as a solid in between and on layers of the graphene-based material sheet structure. In other words, the graphene-based material is intercalated with solid inorganic metal hydrate.

For avoidance of any doubt, the graphene-based composite per se also presents as a solid.

The layered sheet structure of the graphene-based material may comprise graphene, graphene oxide, partially reduced graphene oxide, reduced graphene oxide or a combination of two or more thereof.

In one embodiment, the graphene-based composite comprises reduced graphene oxide.

An important feature of the graphene-based composite is the intercalated inorganic metal hydrate. As used herein the expression "inorganic metal hydrate" is intended to mean a hydrated inorganic compound comprising one or metal atoms. The inorganic metal hydrate may be a salt or a neutral compound and includes hydrated: metal oxides, metal hydroxides, metal oxide hydroxides and metal borates.

In one embodiment, the inorganic metal hydrate is a salt.

By the inorganic metal compound being a "hydrate" or being "hydrated" is meant the compound contains physically and/or chemically absorbed and/or bonded water such as water of crystallisation. Such hydrated compounds are typically identified with the indicator $.xH_2O$.

The metal of the inorganic metal hydrate is intended to include so called metalloids.

The graphene-based material may be intercalated with two or more different inorganic metal hydrates.

Examples of inorganic metal hydrate that may be used in accordance with the invention include alumina monohydrates, alumina trihydrates, magnesium hydrates, and metal borates such as hydrated zinc borate, hydrated barium borate, hydrated sodium metaborate, sodium tetraborate decahydrate and combinations thereof.

In one embodiment, the inorganic metal hydrate comprises hydrated sodium metaborate.

In another embodiment, the graphene-based composite comprises reduced graphene oxide intercalated with hydrated sodium metaborate.

Provided the inorganic metal hydrate can be intercalated within the graphene-based material, there is no particular limitation on the type or the physical form which the inorganic metal hydrate may take.

In one embodiment, the graphene-based material is intercalated with inorganic metal hydrate the form of microparticles, nanoparticles, a film, a sheet or combinations thereof.

As used herein, reference to "nanoparticles" are particles having a largest dimension of no more than 100 nm.

As used herein, reference to "microparticles" are particles having a largest dimension of no more than 1000 nm.

When in particle form, the largest dimension of the inorganic metal hydrate will generally range from about 50-500 nm.

Generally, the graphene-based composite will comprise about 20 wt % to about 80 wt % graphene-based material and about 20 wt % to about 80 wt % intercalated inorganic metal hydrate.

The graphene-based composite may comprise one or more other components, for example another fire retardant material. In that case, the wt. % of the graphene-based material and/or the intercalated inorganic metal hydrate will be adjusted accordingly.

The graphene-based material and inorganic metal hydrate used in accordance with the invention can be sourced commercially or made by techniques known in the art.

The graphene-based composite can conveniently be prepared by a method comprising (i) providing a liquid composition comprising graphene-based material and inorganic metal hydrate, and (ii) removing liquid from the composition so as to retain the graphene-based material and inorganic metal hydrate in the composition, wherein the process of removing liquid in step (ii) promotes intercalation of the inorganic metal hydrate in the graphene-based material to afford the graphene-based composite.

By providing a liquid composition comprising graphene-based material and inorganic metal hydrate, the composition will of course also comprise a liquid. The liquid may be organic (solvent), aqueous or a combination thereof.

Those skilled in the art will appreciate that graphene-based material is substantially insoluble in most liquids, but can be readily dispersed within a liquid.

The inorganic metal hydrate may be soluble or insoluble in the liquid composition.

The method of preparing the composite may comprise (i) providing an aqueous liquid composition comprising graphene-based material and inorganic metal hydrate, and (ii) removing water from the composition.

Including inorganic metal hydrate within a liquid dispersion of graphene-based material and removing liquid from the resulting composition (so as to retain the graphene-based material and inorganic metal hydrate in the composition) allows for the inorganic metal hydrate to become intercalated within the layered structure of the graphene-based material.

Provided the graphene-based material and inorganic metal hydrate are retained in the composition, liquid may be removed from the composition by any suitable means.

Liquid can be removed from the composition by evaporation. If required, heat may be applied to the composition to promote such evaporation.

Where the inorganic metal hydrate is soluble in the liquid used for the composition, removing the liquid from the composition can promote formation of inorganic metal hydrate particles, crystals, film or sheet that intercalate within the layered structure of the graphene-based material.

Where the inorganic metal hydrate is insoluble in the liquid used for the composition, removing the liquid from the composition will simply promote intercalation of the pre-existing inorganic metal hydrate particles within the layered structure of the graphene-based material. In that case, the inorganic metal hydrate particles used will of course be of a suitable size for such intercalation to occur.

The inorganic metal hydrate used to form the graphene-based composite may itself be pre-formed and introduced to the liquid composition provided for preparing the graphene-based composite. Alternatively, the inorganic metal hydrate may be prepared in situ as part of the method of preparing the graphene-based composite.

For example, the liquid composition comprising graphene-based material and inorganic metal hydrate may be provided by an aqueous liquid composition comprising graphene oxide and sodium borohydride, wherein the graphene oxide is reduced by the sodium borohydride to afford reduced graphene oxide and hydrated sodium metaborate.

The graphene-based composite can be produced by (i) providing an aqueous liquid composition comprising graphene oxide and sodium borohydride, wherein the sodium borohydride reduces the graphene oxide to afford reduced graphene oxide and hydrated sodium metaborate, and (ii) removing water from the so formed composition so as to retain the graphene-based material and hydrated sodium metaborate in the composition, wherein the process of removing water in step (ii) promotes intercalation of the hydrated sodium metaborate in the graphene-based material to afford the graphene-based composite.

The method of the invention comprises providing the substrate with a graphene-based composite. Once provided with the composite the substrate will of course comprise the composite.

By the substrate "comprising" the graphene-based composite, or "providing" the substrate with the composite, is meant the composite is suitably physically associated with the substrate so as to impart the improved fire retardant properties. In other words, the substrate comprises or is provided with a graphene-based composite such that the composite is physically associated with the substrate.

The graphene-based composite may be provided on a surface of the substrate and/or within the substrate matrix. The substrate may comprise or be provided with the composite by the composite being coated on, absorbed or impregnated in and/or compounded with the substrate material.

For example, the composite may present as a coating on a surface of a substrate and/or the composite may be distributed throughout the substrate matrix material.

Providing the substrate with the graphene-based composite has been found to advantageously impart excellent fire retardant properties to the substrate. Without wishing to be limited by theory, it is believed the inorganic metal hydrate and graphene-based material that form the graphene-based composite provide for a synergistic effect that gives rise to superior fire retardant properties relative to the fire retardant properties provided by the graphene-based material or inorganic metal hydrate when used alone.

The unique fire retardant properties imparted by the graphene-based composite may be further explained with reference to FIG. 2.

Figure 2:
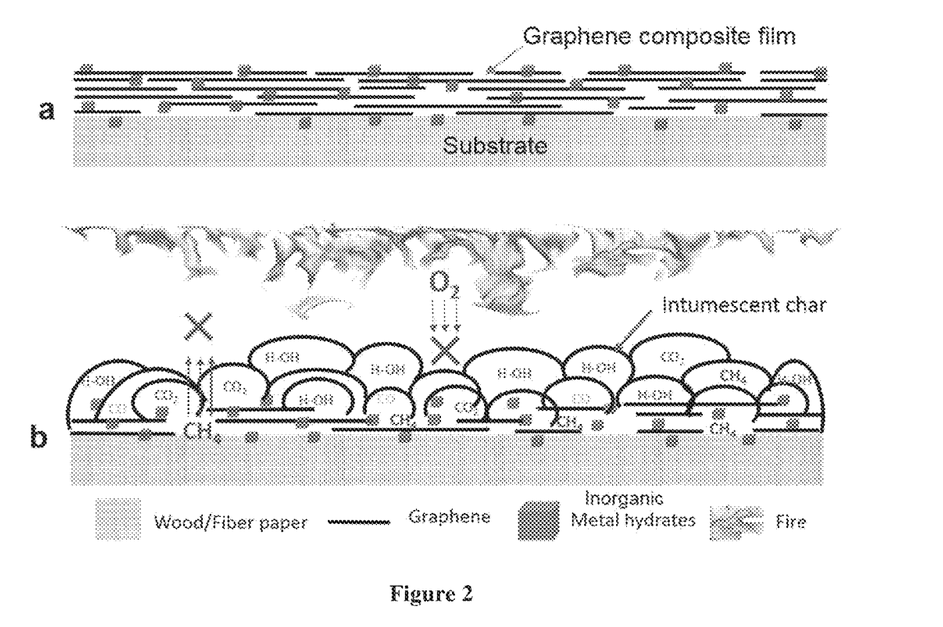
FIG. 2 shows a schematic illustration of (a) substrate provided with the graphene-based composite in accordance with the invention, and (b) fire retardant features afforded by the graphene-based composite used in accordance with the invention.

FIG. 2 (a) represents a substrate coated with a graphene-based composite in accordance with the invention. The graphene-based composite coating can be seen as comprising the graphene-based material intercalated with inorganic metal hydrate (IM.xH$_2$O).

FIG. 2 (b) illustrates the graphene-based composite coated substrate of FIG. 2 (a) being exposed to fire. The graphene-based composite used in accordance with the invention is believed to provide numerous mechanisms by which improved fire retardant properties are imparted to the substrate. Without wishing to be limited by theory, the inorganic metal hydrate is believed to function as a heat sink as it undergoes endothermic dehydration releasing water into the surrounding environment. This in turn is believed to promote a unique intumescent effect. The graphene-based material is believed to function synergistically to promote resistance for (i) escape from the substrate of toxic and flammable volatiles (e.g. CH$_4$), and (ii) access of oxygen to the flammable substrate, to thereby enhance flame extinguishing properties. The graphene-based material is also believed to also act as a carbon donor to create a physical barrier between the unburnt substrate and a flame to thereby protect the substrate. Still further, some inorganic metal hydrates (e.g. sodium metaborate) can promote a high degree of binding between layers of the graphene-based material and also between the substrate and the composite graphene-based composite, thereby providing for a robust fire retardant system. This is particularly useful where the composite is provided in the form of a coating on a substrate. Such collective features of the graphene-based composite have been found to function as a highly effective, efficient and robust fire retardant system.

Figure 3:
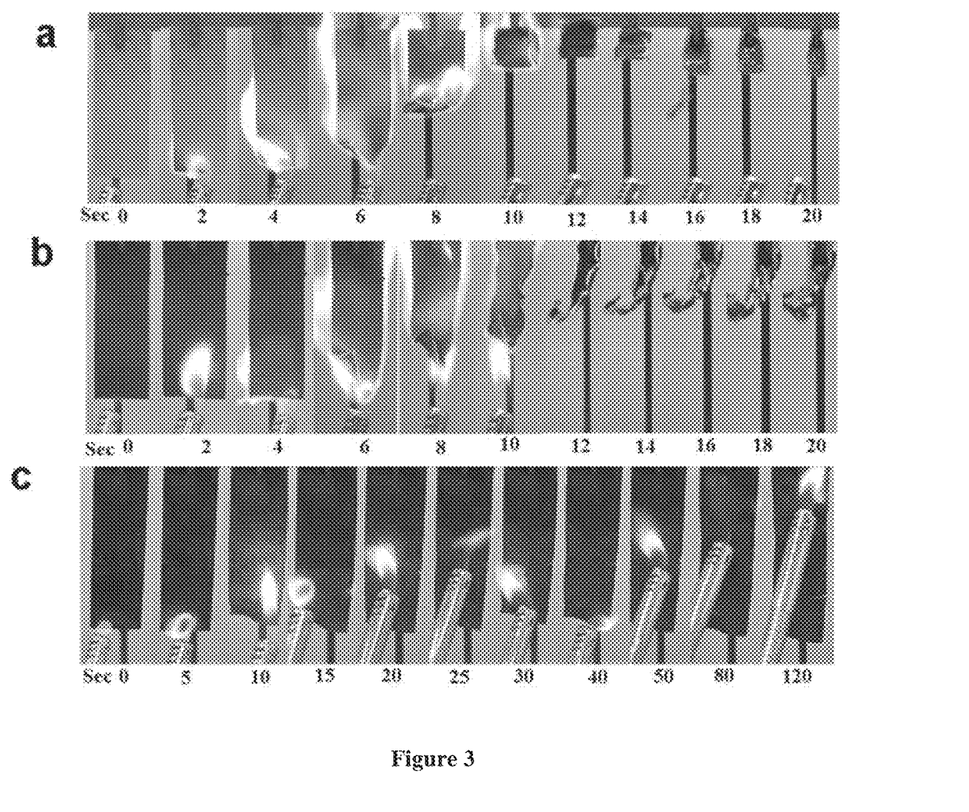
FIG. 3 shows flammability testing of (a) paper, (b) paper treated with reduced graphene oxide, and (c) paper treated with a reduced graphene oxide/hydrated sodium metaborate composite in accordance with the invention.

The excellent fire retardant properties imparted by the graphene-based composite are clearly illustrated in FIG. 3 which presents results of a series of flame tests. In the flame tests a paper sample is exposed to a naked flame and its flammability is assessed as a function of time. FIG. 3(a) tests the base paper sample, FIG. 3(b) tests the base paper sample coated with only reduced graphene oxide, and FIG. 3(c) tests the base paper sample coated with a graphene-based composite in accordance with the invention, the composite comprising reduced graphene oxide intercalated with hydrated sodium metaborate. As can be clearly seen from FIG. 3, the base paper sample and the paper coated with reduced graphene oxide readily ignite and are fully combusted after about 10 seconds. However, the paper sample coated with graphene-based composite in accordance with the invention fails to ignite upon being exposed to a naked flame for at least 120 seconds.

Figure 4:
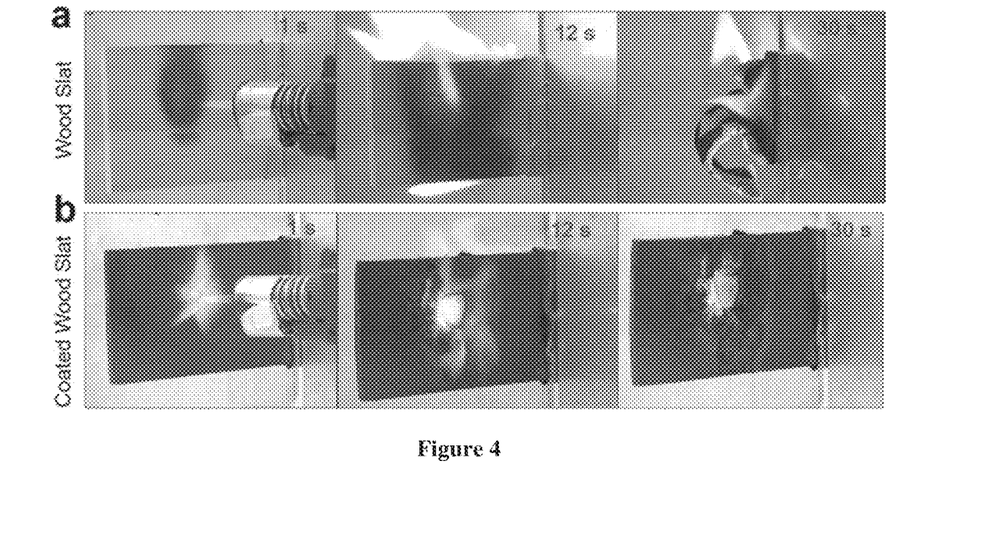
FIG. 4 shows a pine wood slat being subjected to a burn test (exposed to a butane flame for 12 seconds at a distance of 20 mm), where (a) employs a pine wood slat and (b) employs a pine wood slat coated with a reduced graphene oxide/hydrated sodium metaborate composite in accordance with the invention.

Similarly, FIG. 4 shows a pine wood slat being subjected to a burn test (exposed to a butane flame for 12 seconds at a distance of 20 mm), where (a) employs a pine wood slat and (b) employs a pine wood slat coated with a reduced graphene oxide/hydrated sodium metaborate composite in accordance with the invention. The untreated pine wood slat can be seen to be almost completely combusted after 30 seconds, while the pine wood slat coated with the composite in accordance with the invention can be seen to only be effected by the flame at its point of contact, with the fire not propagating and the remainder of the slat being largely undamaged.

Figure 5:
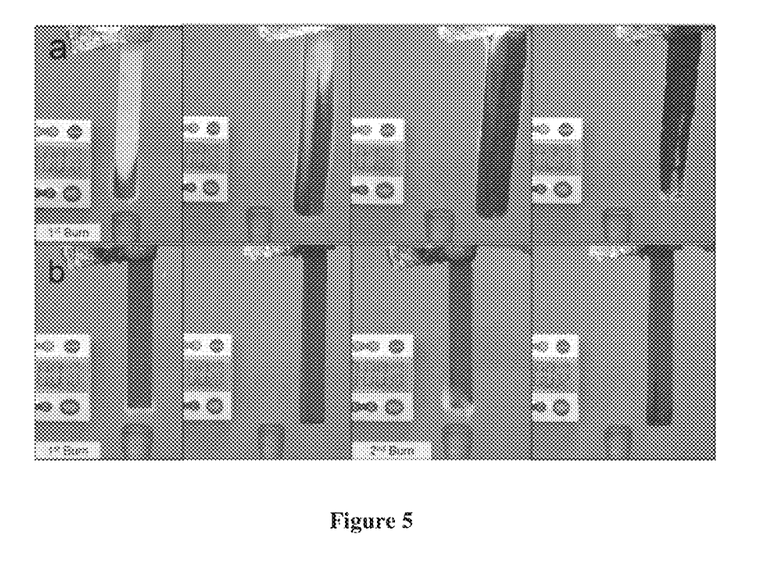
FIG. 5 shows a pellet formed from saw dust being subjected to a vertical burn test (UL-94), where (a) employs a pellet formed from saw dust and (b) employs a pellet formed from saw dust provided with a reduced graphene oxide/hydrated sodium metaborate composite in accordance with the invention.

Also, FIG. 5 shows a pellet formed from saw dust being subjected to a vertical burn test (UL-94), where (a) employs a pellet formed from saw dust and (b) employs a pellet formed from saw dust provided with a reduced graphene oxide/hydrated sodium metaborate composite in accordance with the invention. The coated pellet (b) displayed excellent fire-retardancy with no flame propagation behaviour. No flaming or glowing combustion was observed for the composite treated sample, hence those samples were graded as V-0. The burning of the composite treated sample ceased instantly with no vertical lift of the flame, whereas the untreated sawdust pellet showed higher degree of flammable properties that continued till the end (up to the holding clamp) with an approximate linear burning rate of 0.5 mm/s.

A feature of the present invention is providing the substrate with the graphene-based composite. The presence of the graphene-based composite in and/or on the substrate advantageously imparts the improved fire retardant properties to the substrate.

The substrate may be provided with the graphene-based composite by any suitable means.

When providing the substrate with the graphene-based composite, the graphene-based composite may be used in a pre-formed state (i.e. in the form of the composite per se). For example, the graphene-based composite may form part of a liquid composition that is coated on or impregnated in the substrate using application techniques well known to those skilled in the art. In that case, the liquid composition may comprise the graphene-based composite in the form of a dispersion within a liquid (organic (solvent), aqueous or a combination thereof).

As a pre-formed material the graphene-based composite may also be used in the form of a solid (e.g. powder) and combined with substrate material, with the resulting blend of the substrate material and graphene-based composite optionally processed so as to provide for a product made of the substrate material comprising the graphene-based composite. For example, the substrate may be in the form of a thermoplastic polymer whereby the thermoplastic polymer is melt processed with the graphene-based material so as to provide for a thermoplastic polymer product comprising the graphene-based composite distributed throughout the thermoplastic polymer matrix.

As a pre-formed material the graphene-based composite may also be blended with cellulosic material such as saw dust and the resulting blend compressed so as to form a so called reconstituted wood product comprising the graphene-based composite distributed throughout the product.

Alternatively, the graphene-based composite can be prepared in situ using precursor components as part of the process of providing it to the substrate. For example, graphene-based material may be dispersed in a liquid which also comprises the inorganic metal hydrate. The resulting liquid composition can then be used to coat or impregnate the substrate. Removing liquid from the coated or impregnated liquid composition, while retaining the graphene-based material and inorganic metal hydrate in the composition, can promote formation of the composite in situ.

In one embodiment, the substrate is provided with the graphene-based composite using precursor components of the graphene-based composite.

Reference herein to "precursor components" of the graphene-based composite is intended include graphene-based material and inorganic metal hydrate. As a "precursor component", the inorganic metal hydrate may not be intercalated with the graphene-based material but rather that intercalation occurs as part of the process of providing the substrate with the graphene-based composite.

The graphene-based composite or precursor components thereof may be provided in the form of a coating composition which is applied to the substrate using conventional techniques such as spraying, dip coating, doctor blade and/or brushing.

The coating composition may be in the form of a paint composition.

Where the substrate is suitably absorbent, a liquid composition comprising the graphene-based composite or precursor components thereof may be used to impregnate the substrate.

Alternatively, the graphene-based composite per se may be blended with the substrate material, with that resulting blend optionally being further processed such as being compressed or extruded.

In one embodiment, the substrate is provided with the graphene-based composite by coating the substrate with a composition comprising the graphene-based composite or precursor components thereof. Coating the substrate with the composition may be performed by techniques such as spraying, dip coating, doctor blade and/or brushing.

In another embodiment, the substrate is provided with the graphene-based composite by impregnating the substrate with a composition comprising the graphene-based composite or precursor components thereof. Impregnation of the substrate with the composition may be performed by soaking the substrate in the composition.

The composition comprising the graphene-based composite for coating or impregnating the substrate may be a liquid composition. The liquid component of the composition may be organic (solvent), aqueous or a combination thereof. That composition may comprise other components such as polymer.

In a further embodiment, the substrate is a thermoplastic polymer and it is provided with the graphene-based composite by melt processing the polymer with the graphene-based composite.

In yet a further embodiment, the substrate is a thermoset polymer and it is provided with the graphene-based composite by blending the graphene-based composite with precursor materials used to make the thermoset polymer. Precursor materials used to make thermoset polymer include monomer and pre-polymer that is polymerised and cross-linked to form the thermoset polymer matrix.

In one embodiment the substrate is provided with the graphene-based composite by coating or impregnating the substrate with a liquid composition comprising the graphene-based composite.

In another embodiment the substrate is provided with the graphene-based composite by (i) coating or impregnating the substrate with a liquid composition comprising the graphene-based material and the inorganic metal hydrate, and (ii) removing liquid from the coated or impregnated liquid composition while retaining the graphene-based material and inorganic metal hydrate in the composition so as to form and provide the graphene-based composite.

In a further embodiment the substrate is provided with the graphene-based composite by (i) coating or impregnating the substrate with a liquid composition comprising the graphene-based material and hydrated sodium metaborate, and (ii) removing liquid from the coated or impregnated liquid composition while retaining the graphene-based material and sodium metaborate in the composition so as to form and provide the graphene-based composite.

In another embodiment, the substrate is provided with the graphene-based composite by (i) coating or impregnating the substrate with an aqueous composition comprising the graphene-based material and hydrated sodium metaborate, and (ii) removing water from the coated or impregnated liquid composition so as to form and provide the graphene-based composite.

As described herein, the inorganic metal hydrate used to form the graphene-based composite may be pre-formed and introduced to the liquid composition provided for preparing the graphene-based composite. Alternatively, the inorganic metal hydrate may be prepared in situ as part of the process of preparing or forming the graphene-based composite.

Accordingly, "precursor components" of the graphene-based composite can also include a precursor compound(s) for preparing the inorganic metal hydrate. Precursor compounds to an inorganic metal hydrate such as sodium metaborate can include sodium borohydride which is oxidised, sodium carbonate in combination with borax, and sodium tetraborate in combination with sodium hydroxide.

In one embodiment, the substrate is provided with the graphene-based composite by (i) providing an aqueous liquid composition comprising graphene oxide and sodium borohydride, wherein the graphene oxide is reduced by the sodium borohydride to afford reduced graphene oxide and hydrated sodium metaborate, (ii) coating or impregnating the substrate with the aqueous liquid composition provided for in step (i), and (iii) removing water from the coated or impregnated aqueous liquid composition so as to form and provide the graphene-based composite.

The invention may further comprise providing the substrate with inorganic metal hydrate that does not form part of the graphene-based composite per se. In that case, the substrate will comprise the graphene-based composite and also inorganic metal hydrate that does not form part of the graphene-based composite. Such "additional" inorganic metal hydrate may be selected from the inorganic metal hydrates herein described.

For example, in one embodiment the substrate used is impregnated with inorganic metal hydrate. In that case, the substrate is impregnated with inorganic metal hydrate and can then also be impregnated and/or coated with the graphene-based composite.

Providing the substrate with inorganic metal hydrate that does not form part of the graphene-based composite per se can further enhance fire retardant properties of the substrate.

As a coating on a substrate, the graphene composite may be provided in the form of film of average thickness depending on the desired application. For example, the graphene composite film may have a thickness of up to 500 microns.

The present invention will herein after be described with reference to the following non-limiting examples.

EXAMPLES

Preparation of Graphene Oxide (GO) and Reduced GO (rGO)

Graphite flakes (>94% of carbon) were chemically exfoliated following the improved Hummers method. The complete reaction was performed using a 9:1 ratio of $H_2SO_4/H_3PO_4$ (360:40 ml) with 18 g of $KMnO_4$ for the oxidation of 3 g of graphite flakes. Exfoliation proceeded at 50° C. while stirring for 12 h. The solution was then cooled to room temperature and poured onto ice cubes (300 ml) with 3 ml of 30% $H_2O_2$. Finally, the mixture was repeatedly centrifuged at 4000 rpm for 2 h for the purpose of washing with distilled water (twice), 32% of HCl (twice) and ethanol (twice) respectively to obtain GO, which was oven dried at 40° C. for 12 h. Reduced GO is prepared by using reducing agents such as hydrazine, sodium borohydride ($NaBH_4$), metal hydrides, sugars, vitamin C, amino acids or by thermal reduction.

Preparation of Graphene

Graphene was prepared without of preparation of GO step by direct exfoliation of graphite using electrochemical process. Electrochemical process is performed using two electrode electrochemical process with cell and power supply where graphite is used as one electrode and Ti or stainless steel as another electrode. By applying voltage between electrodes graphene is exfoliated from graphite electrode and collected outside the cell. Other processes of graphene production including thermal/mechanical were also used for preparation of graphene to making graphene based fire-retardant materials presented in this invention.

Preparation of Composite Formulation-1 (Solution Based)

Reduced-GO was prepared by reducing 50 ml of aqueous dispersion of GO (3.5 mg/ml) with a certain amount of $NaBH_4$ as reducing agent to form a mixer of 0.1 mol $L^{-1}$ $NaBH_4$ and then refluxed and stirred at 60° C. for 8 hr. The reaction simultaneously produced hydrated sodium metaborate resulted from the hydrolysis of $NaBH_4$ in the solution (shown in Equation 1).

$$NaBH_4 + (2+x)H_2O \xrightarrow{\Delta} NaBO_2 \cdot xH_2O + 4H_2 + \text{heat} \tag{1}$$

Preparation of Composite Formulation-2 (Solution Based)

Graphene material in two forms, namely reduced Graphene Oxide (GO) prepared by chemical, thermal reduction or any other process, or graphene prepared synthetically or from graphite by electrochemical, thermal/mechanical or any other process, were used to make graphene fire-retardant composite solution. Graphene aqueous solution with a concentration of 2-10% was mixed with hydrated-sodium metaborate to make dissolved hydrated-SMB varying the composition percentage between 10 to 80 wt %.

Preparation of Composite Formulation-3 (Solution Based)

Composite formulation-3 is an extension of the formulation-1 and formulation-2, where additional inorganic metal hydrates, specifically hydrated metal oxides and hydroxides (e.g. magnesium hydroxide and aluminium hydroxide) are added with a minimum amount of 5 wt % up to 20 wt % of the mixer in formulation-1 and formulation-2.

Preparation of Composite Formulation-4 (Solution Based)

Composite formulation-4 is an extension of the formulation-1 or formulation-2 or formula-3 where additional inorganic metal hydrates, specifically hydrated borate compounds, which are not limited to hydrated aluminium, magnesium, zinc or barium borates, are added with a minimum amount of 5 wt % up to 20 wt % of the mixture in formulation-1 or formulation-2 or formulation-3.

Preparation of Composite Formulation-5 (Solution Based)

Composite formulation-5, where graphene material in two forms, namely reduced Graphene Oxide (rGO) prepared by chemical, thermal reduction or any other process, or graphene papered synthetically of by electrochemical, thermal/mechanical or any other process, were used to make graphene fire-retardant composite solution. Graphene aqueous solutions with a concentration of 2-10% were mixed with other non-borate based hydrated metal oxides and hydroxides at a concentration of 20 wt % up to 80 wt % of the mixture.

Preparation of Composite Formulation (Powder Based) Example 1

Composite formulation (powder based) were prepared using solution based formulations (1-5) by drying followed by grinding formed products by grinder or ball milling to form fine powder composed with graphene sheets decorated with inorganic metal hydrates such as SMB nanoparticles.

Preparation of Composite Formulation (Powder Based) Example 2

Graphene material, namely rGO and graphene in powder form were mixed with inorganic metal hydrates, specifically hydrated borate compounds also in powder form and mechanically blended using ball milling process.

Preparation of Composite Formulation (Powder Based) Example 3

Graphene material, namely rGO and graphene in powder form were mixed with other inorganic metal hydrates such as (Al(OH)3.xH2O), not only hydrated borate compounds also in powder form and mechanically blended using ball milling process.

Preparation of Composite Formulation (Paint Based)

Composite formulation (paint based) were prepared using solution based formulations (1-5) by adding thickening additive (e.g. sodium silicate) to adjust optimised viscosity of paint for brushing.

Preparation of Composite Formulation (Paint Based)

Composite formulation (paint based) were prepared using solution based formulations (1-5) by adding thickening additive (e.g. sodium silica) to adjust optimised viscosity of paint for brushing.

Surface Coatings of Flammable Materials

To make flammable materials such as cellulose or polymer based materials and others to be fire retardant their surface was coated with a solution based composite formulations (1-5). This process was performed by means of dipping flammable materials in composite solution (1-5), spraying composite solution (1-5) on their surface, or brushing composite formulation (paint based).

Impregnation of Wood Chips

For impregnation, 2.6 g of purified pine sawdust (500 μm to 1 mm) were treated with the 50 ml of rGO/SMB into a beaker and kept stirring for 5 hour at 70° C. The dried sawdust sample was impregnated with SMB and found well coated with the rGO/SMB composite.

Coating of Paper by Spraying of Solution Based Composite Formulation (1-5)

The prepared solution based composite formulation (1-5) were sprayed on piece of paper (A4) covering the entire area (from edge to edge) on both sides and then dried in the oven at 60° C. for 1 h

Coating of Wood by Spraying of Solution Based Composite Formulation (1-5)

The prepared solution based composite formulation (1-5) was sprayed on piece of wood (20×20 cm) on both sides covering the entire area followed by drying by hair dryer.

Coating of Polymer Substrates by Spraying of Solution Based Composite Formulation (1-5)

The prepared solution based composite formulation (1-5) was sprayed on piece of polymer surface (5×5 cm) on both sides covering the entire area followed by drying by hair dryer.

Preparation of Non Flammable Cellulosic Material

Mixed cellulosic material (e.g. wood, paper, natural fibres etc) was blended with solution based composite formulation (1-5) followed by drying in the oven at 60° C. for 1 h and further processing (pressing, extrusion etc).

Preparation of Non Flammable Polymer Materials (General)

Polymer based materials in the form of pellets, granules or powder can be mixed with formulation (1-5) or powder based formulations (1-3), followed by extrusion or casting processes to make non-flammable polymer.

Preparation of Non Flammable Polymer Materials (Part A)

Figure 6:
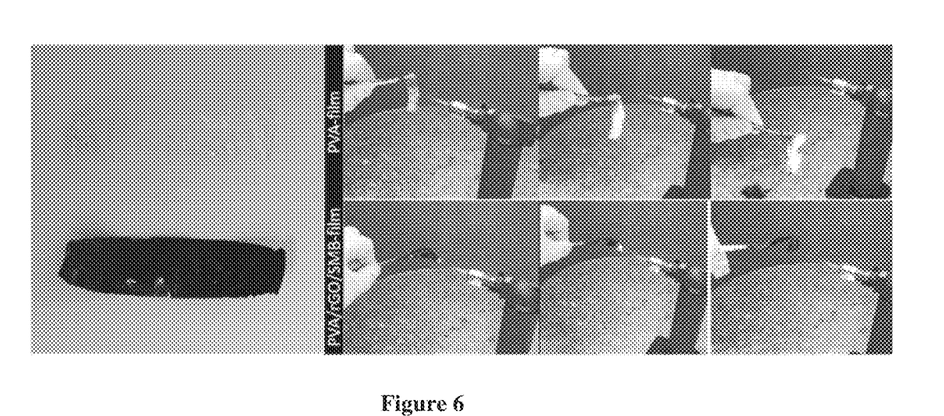
FIG. 6 shows polymer (water soluble-PVA) sample being subjected to a burning test (UL-94), where (top) employs a non-treated sample, and (bottom) employs a polymer sample impregnated with a reduced graphene oxide/hydrated sodium metaborate composite in accordance with the invention.

Water soluble polymer materials (e.g. polyvinyl alcohol (PVA)) in the form of pellets, granules or powder was mixed with formulation (1-5) or powder based formulations (1-3), and stirred at 90° C. for 3 hrs followed by casting or extrusion process to make non-flammable polymer (see FIG. 6).

Preparation of Non Flammable Polymer Materials (Part B)

Figure 7:
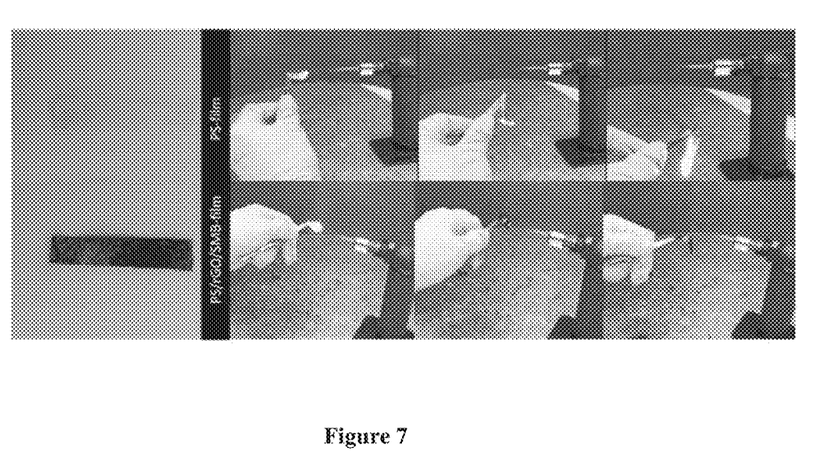
FIG. 7 shows polymer (oil soluble-polystyrene) sample being subjected to a burning test (UL-94), where (top) employs a non-treated sample, and (bottom) employs a polymer sample impregnated with a reduced graphene oxide/hydrated sodium metaborate composite in accordance with the invention.

Solvent soluble polymer materials (e.g. polystyrene) in the form of pellets, granules or powder was dissolved in DMF and mixed with solution (1-5) or powder based formulations (1-3), with concentration 20 wt % to 50 wt % of the mixture. The mixture was stirred at 115° C. for 3 hours followed by casting or extrusion process to make non-flammable polymer (see FIG. 7).

Characterizations

Scanning electron microscope (SEM-FEI QUANTA 450, Japan) was used to analyze the GO and rGO surface morphology, as well as to measure the coating thickness of the vertically aligned sample at an accelerating voltage of 5 KV. The energy dispersive X-ray (EDX) unit was used to capture the elemental peaks of rGO coatings containing sodium metaborate crystals at 5.0 KV. A high resolution Philips CM200, Transmission Electron Microscope (TEM), Japan was used for imaging the exfoliated GO flakes at 200 KV. TEM sample was prepared by dispersing the synthesized GO in ethanol to form a homogeneous dispersion. A Nikon Optical Petrographic Microscope (LV100 POL, USA) was used to analyze the cross-cut surfaces in order to mark the adhesion grade. Vibrational stretching mode of different oxygen functional groups in GO and rGO were studied by Fourier transform infrared spectroscopy (FTIR) (Nicolet 6700 Thermo Fisher, USA). TGA (Thermogravimetric analysis) and DTG (Derivative Thermogravimetry) of treated and untreated sawdust were analysed by a TA instruments (Q-500, Tokyo, Japan) in air atmosphere. The temperature was raised from ambient temperature to 600° C.

at a rate of 5° C./min for the combustion in air environment. Thermogravimetric analysis coupled with Fourier transform infrared (TGA-FTIR) for the real time analysis of multiple gas phase compounds released from the combustion samples were done by a PerkinElmer TG-IR EGA System connected to TL 8000 (TG-IR EGA, PerkinElmer Ltd, UK). The operation is accomplished in air atmosphere for an approximately sample mass of 16 mg at a rate of 6° C./min.

Volatiles Suppression and Fire Retardant Tests

The test for smoke and volatiles suppression was carried out inside a one end closed glass cylinder of 4 cm inner diameter so that the smoke and volatiles can be visually observed. Two small beakers (10 ml) containing 300 mg of preheated (at 80° C.) sawdust (treated and untreated) were placed on a hot surface (300° C.). The hot plate was allowed to be thermally stable at 300° C. for 10 min before placing the samples. The beakers with samples were covered by two similar glass cylinders for the observation. The instant reaction of samples placed on the hot plate was recorded for 30 min by a high definition video camera (Sony HDR-PJ260).

In order to carry out the test of self-ignition properties, both the untreated and treated sawdust (80 mg) were placed on a screen mesh well-set above a Bunsen burner (3 cm apart from the tip of burner) to be in contact to the flame. The flame height and gas flow of Bunsen burner was set by keeping a half quarterly opened air hole that is constant for both type of the samples and placed in the middle of the flame. The combustion phenomena (self-igniting, flame propagation) were recorded for further analysis by a high definition video camera (Sony HDR-PJ260).

The pellets of a dimension of 120 mm×13 mm×3.5 mm were made out of untreated and treated sawdust under a hydraulic pressure of 5 ton. The fire retardant behaviour of these pellets were assessed by UL-94 standardized vertical burning tests. Five specimens of each type of samples were measured to ensure reproducibility of data and to grade their flammability. The time until the flame extinguished itself and the distance the burn propagated have been measured, then figured out the linear burning rate in mm per minute.

To examine rag-paper flammability with the application of rGO/SMB material as coating, fibre based paper was dip coated and cured under 50° C. for several time that increases the material loading up to 15 wt %. The samples with and without coating were placed under the candle burning test for fire retardant test (see FIG. 3).

Results

The exfoliation of GO sheets from graphite was determined by transmission electron microscope (TEM). The simultaneous reduction of GO and formation of SMB by hydrolysis of $NaBH_4$ forms an aqueous solution of rGO/SMB. The presence of hydrated-SMB between (intercalated) and on top of the rGO sheets was confirmed by TEM. EDX (Energy-dispersive X-ray) of the so formed graphene-based composite showed elemental peaks of boron (B), carbon (C), oxygen (O) and sodium (Na) at 0.185, 0.277, 0.523 and 1.040 KeV, respectively confirming the existence of SMB on the rGO surfaces.

A sample of rGO/SMB composite was taken under FTIR spectroscopy to investigate the characteristic peaks of the synergy. The oxygen functional groups of GO are almost entirely removed during the reduction process using $NaBH_4$ indicating successful reduction of GO. The appearance of new peaks observed in the sample at 692 $cm^{-1}$ and 783 $cm^{-1}$ indicate O—B—O ring asymmetric bending. The ring B—O asymmetric stretching vibrations appear strongly at 932, 1083, 1248 and 1432 $cm^{-1}$. Furthermore, the peak at 3353 $cm^{-1}$ indicates hydrogen bond between hydroxyl groups of metaborate anion and water.

Thermogravimetric analysis of GO and rGO/SMB composite ($N_2$ atmosphere, heating at 5° C./min) shows significant difference in the mass loss profiles. The GO sample shows a first stage mass loss (14.45%) from ambient temperature to 100° C. due to the evaporation of water molecules in the GO structure, which is slightly greater than rGO/SMB at this stage. In the second stage between 100° C. to 250° C., the GO sample has a massive mass loss (54.68%) principally attributed to the removal of oxygen functional groups, whereas the rGO/SMB shows 25.72% loss caused by the release of additional water molecules from the hydrated-SMB. The anhydrous sodium metaborate and rGO exists when the temperature exceeds 350° C.

The modification and coating of pine-sawdust was achieved by a solution treatment of an aqueous-rGO that contains dissolved-SMB. The loading was performed by soaking sawdust into the rGO/SMB solution. The dried mass of the treated sample increased by ~14.67% which did not make a huge difference in the total heat released 460 Cal/gram) between the samples which was determined by a high pressure (3000 KPa) oxygenated combustion of both the untreated and treated sawdust in a bomb calorimeter.

The evolution of gaseous products and volatiles suppression was analysed by FTIR. The FTIR spectra (4000-500 $cm^{-1}$) at different selected temperatures (100° C., 200° C., 250° C., 300° C., 325° C., 350° C.) during combustion of the untreated and treated pine sawdust exhibited evolution of gaseous products by temperature change. The presence of water above 250° C. was caused by the cleavage of aliphatic hydroxyl groups confirmed by the appearance of bands at 4000-3500 $cm^{-1}$. The characteristic peaks at 3000-2730 $cm^{-1}$ indicated the existence of methane, which was evolved between 250° C. to 300° C. as a result of cracking methoxyl ($OCH_3$—) and methyl ($CH_3$—). The methylene group (—$CH_2$—) at high temperature also generated methane ($CH_4$). As the temperature increases to 350° C., the intensity peak of carbon dioxide ($CO_2$) enhances at 2400-2260 $cm^{-1}$. The large amount of $CO_2$ release is caused by the cracking of cellulose and lignin, and the carbonized char burning at this temperature. The incomplete combustion of the pine sawdust also generated carbon monoxide (CO) as identified at 2260-1990 $cm^{-1}$ between the temperatures from 300° C. to 350° C. Absorption bands at 1900-1660 $cm^{-1}$ and 1500 $cm^{-1}$ were related to C=O stretching for aldehyde or ketone compounds, C—O—C bend stretching for the groups of phenols, respectively. Absorptions at 900 and 650 $cm^{-1}$ were assigned to C—H stretching for aromatic hydrocarbons. At an increased temperature (350° C.) the organic volatile compounds (aldehyde or ketone, phenols, alkanes, alkenes and aromatic hydrocarbon) begin to release violently.

Water content was identified at 4000-500 $cm^{-1}$ since the beginning of the heating process from 100 to 350° C. as the treated sawdust contained relatively more water molecules because of the presence of hydrated sodium metaborate. The bonded water molecules were released in two steps; once between 83 and 155° C. and second between 249 and 280° C. However, the intensity of other gases ($CH_4$, $CO_2$, CO, organic compounds) released from the treated samples were significantly lower at the selected temperatures possibly attributed to the impermeable gaseous barrier effect from the graphene-base composite. The barrier effect of the graphene-base composite has also been realized by a visual inspection when the treated and untreated samples were placed on a hot plate set at 300° C. for 30 min after a preheating at 80° C. to ensure the loss of additional moisture. The untreated sawdust begun to release smoke (possibly $CO_2$) and moisture (from aliphatic hydroxyl groups) at 3 min and the release of other organic volatiles (yellow and brown) was also observed between 10 to 20 min, whereas, the treated sawdust showed no significant release of observable organic volatiles.

The coated and modified loose sawdust also exhibits outstanding performance to resist flame propagation, when 80 mg of samples were placed on the screen mesh above a Bunsen burner at a distance of 3 cm from the tip of the burner. The untreated sawdust started to propagate a flame between 15 to 20 s that was reinforced at 25 s and finally burned out within 70 s. On the other hand, the treated sawdust samples showed no self-ignition behaviour during the burning for 100 s.

In addition, the fire-retardant behaviour was further assessed by vertical burning tests (UL-94) using the composed samples (120 mm—13 mm×3.5 mm) made from uncoated and coated sawdust. The coated wooden pellet displayed excellent fire-retardancy with no flame propagation behaviour for the wooden pellet made from the treated sawdust. No flaming and glowing combustion was observed for each of the five treated specimens; hence the material is graded as V–0. Each burning for the treated specimen ceased instantly with no vertical lift of the flame, whereas the untreated sawdust pellet showed higher degree of flammable properties that continued till the end (up to the holding clamp) with an approximate linear burning rate of 0.5 mm/s.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of improving fire retardant properties of a substrate, the method comprising coating the substrate with a graphene-based composite comprising graphene-based material intercalated with inorganic metal hydrate, wherein the inorganic metal hydrate comprises hydrated sodium metaborate.

2. The method according to claim 1, wherein the coating includes surface impregnation with a liquid composition of the graphene-based composite.

3. The method according to claim 1, wherein the substrate is provided with the graphene-based composite by (i) coating the substrate with a liquid composition comprising the graphene-based material and the inorganic metal hydrate, and (ii) removing liquid from the coated composition so as to retain the graphene-based material and the inorganic metal hydrate in the coated composition and form the graphene-based composite.

4. The method according to claim 1, wherein the substrate is a thermoplastic polymer and the method further includes incorporating therein the graphene-based composite by melt processing the polymer with the graphene-based composite.

5. The method according to claim 1, wherein the substrate is a thermoset polymer and the method further includes blending the graphene-based composite with precursor materials used to make the thermoset polymer.

6. The method according to claim 1, wherein the graphene-based composite comprises one or both of reduced graphene oxide and graphene.

7. The method according to claim 1, wherein the inorganic metal hydrate further comprises hydrated: metal oxides, metal hydroxides, metal oxide hydroxides, metal borates, or and combinations thereof.

8. The method according to claim 1, further including impregnating the substrate with inorganic metal hydrate that does not form part of the graphene-based composite.

9. The method according to claim 1, wherein the substrate comprises cellulosic material, polymeric material or combinations thereof.

10. A substrate with improved fire retardant properties, the substrate having a surface coated with a graphene-based composite comprising graphene-based material intercalated with inorganic metal hydrate, wherein the inorganic metal hydrate comprises hydrated sodium metaborate.

11. The substrate according to claim 10, further including the graphene-based composite distributed by impregnation throughout the substrate matrix material of the substrate.

12. The substrate according to claim 10, wherein the graphene-based composite comprises one or both of reduced graphene oxide and graphene.

13. The substrate according to claim 10, wherein the inorganic metal hydrate further comprises hydrated: metal oxides, metal hydroxides, metal oxide hydroxides, metal borates, or combinations thereof.

14. The substrate according to claim 10, wherein the substrate is impregnated with inorganic metal hydrate that does not form part of the graphene-based composite.

15. The substrate according to claim 10, wherein the substrate comprises cellulosic material, polymeric material or combinations thereof.

16. A graphene-based composite to improve fire retardant properties of a substrate, wherein the graphene-based composite comprises graphene-based material intercalated with inorganic metal hydrate between layers of the graphene-based material, wherein the inorganic metal hydrate comprises hydrated sodium metaborate.

17. The graphene-based composite of claim 16, provided as a liquid coating or impregnate.

18. The graphene-based composite of claim 16, the graphene-based composite comprising reduced graphene oxide and hydrated sodium metaborate.

19. The graphene-based composite of claim 16, including a further amount of said metal hydrate not intercalated with the graphene-based material.

20. The method of claim 1, wherein the substrate is coated by soaking the substrate in the graphene-based composite.

21. The substrate of claim 10, wherein the coating is a soak or dip coating.

* * * * *

UNITED STATES PATENT AND TRADEMARK OFFICE
CERTIFICATE OF CORRECTION

PATENT NO. : 11,174,433 B2
APPLICATION NO. : 16/332695
DATED : November 16, 2021
INVENTOR(S) : Dusan Losic, Md Julker Nine and Diana N H Tran It is certified that error appears in the above-identified patent and that said Letters Patent is hereby corrected as shown below:

In the Claims

Column 18, Line 17: Please delete "or and" and replace with -- or --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*